United States Patent Office 3,091,574
Patented May 28, 1963

3,091,574
TABLET DISINTEGRANTS
Vincent Coletta, Westfield, and Robert B. Warfield, Irvington, N.J., assignors to Bristol-Myers Company, New York, N.Y., a corporation of Delaware
No Drawing. Filed Sept. 5, 1961, Ser. No. 135,800
15 Claims. (Cl. 167—82)

This invention relates to tablet disintegrants. More particularly this invention relates to pharmaceutical tablets containing water soluble or colloidally water despersible material and disintegrating agents comprising both a cation and an anion exchange resin.

Most pharmaceutical tablets are compressed tablets. Their method of manufacture, physical properties and broad composition is well known and can be found in chapter 106 of Remington's Practice of Pharmacy, tenth edition. Generally, such tablets have a hardness of about 6 to 20 Strong-Cobb units. In addition to the medicament the tabletted composition usually contains disintegrants, binders, lubricants and diluents (also referred to as bulking agents) such as those set forth in chapter 106 of the above reference. Illustrative of binders there are mentioned glucose, gum acacia, gelatin and starch. Illustrative of diluents there are mentioned sucrose, lactose, kaolin and sodium chloride. Illustrative of lubricants there are mentioned stearic acid, talc, and magnesium stearate. Illustrative of disintegrants there are mentioned various starches such as corn starch and potato starch.

Pharmaceutical tablets containing large quantities, e.g. greater than 50% of a medicament or other water soluble or colloidally water dispersible material and a conventional disintegrant such as potato starch often require relatively long periods of contact with water or aqueous fluids prior to disintegration. Such periods of time are often greater than 10 minutes and at times as much as an hour or more. The slow disintegration rate of tablets containing large quantities of a colloidally water dispersible medicament and starch, as the disintegrating agent, are well illustrated in col. 5 of U.S. Patent 2,854,381 wherein the problem in that patent was solved by using partially degraded keratin as the disintegrating agent.

It has now been found that disintegration of a compressed pharmaceutical tablet containing water soluble material and particularly colloidally water dispersible material can be greatly hastened in water or aqueous solutions if the disintegrant employed is a combination of certain water insoluble anion and cation exchange resins in the proportions which will be hereinafter set forth. The use of the resin combination enables such tablets to disintegrate in less than 5 minutes and usually in less than 2 or even less than 1 minute after contact or immersion with an aqueous fluid.

The quantities and essential ingredients of the rapidly disintegrating tablets of this invention are: (a) a water soluble or colloidally water dispersible solid preferably constituting at least about 50% of the tablet and particularly from about 65% to about 90% thereof; (b) from about 2% to 10% and preferably 3% to 8% of certain anion exchange resins; and (c) from about 2% to 10% and preferably from about 3% to 8% of certain cation exchange resins. Optionally, lubricants and particularly binders in conventional quantities such as that of about 0.3% to about 5% and preferably about 1% to 3% can also be present.

The term "water soluble solid" or simply "water soluble material" is used herein to describe solids which form either true solutions or colloidal solutions in water at 20° C. The water soluble solids or colloidally water dispersible solids of the tabletted composition can be that of an active medicament, a diluent or a combination of the two. Solids which form true solutions generally require no more than about 30 parts of water to solubilize 1 part thereof at 20° C. True solutions have particle sizes smaller than 1 millimicron; pass through filter paper; cannot be seen with the ultramicroscope; are dialyzable and are characterized by the presence of solute particles of molecular dimensions. Colloidal dispersions (solutions) can be defined as those having particles ranging in size from 0.1 micron to 1 millimicron; pass through ordinary filter paper; their presence is detected by means of the ultramicroscope; the particles are not dialyzable and show Brownian movement. The term "disintegration" as used herein refers to the tablet breaking up or crumbling into a multitude of discrete particles and is not synonymous with solution. Disintegration is complete when substantially all the tablet particles are of a small enough size to pass through a 12 mesh screen. The tablets of this invention can have a hardness of about 6 to 20 Strong-Cobb units and preferably a hardness of 8 to 16 Strong-Cobb units.

The anion exchange resin disintegrants of this invention are the strongly basic quaternary ammonium anion exchange resins such as those having the functional structure —N—(CH$_3$)$_3$$^+$Cl$^-$. Manufacture of the strongly basic anion exchange resins which can be employed in this invention and some of their properties are described in U.S. Patent 2,591,573 and U.S. Patent 2,845,369.

The carboxylic cation exchange resins which enter into the distintegrant mixture of this invention are insoluble polymeric substances which preferably are in the hydrogen form, i.e., they contain the

group as the functional group thereof. These resins can be obtained from acids (or their anhydrides) having an unsaturated linkage which permits their entering into copolymers with polymerizable substances including at least one which causes cross-linking. For example, as is known, maleic anhydride and styrene can be polymerized together and when there is also present an unsaturated compound having at least two non-conjugated double bonds, an insoluble resin results. The cross-linking agent may be one such as divinylbenzene, divinyl ether, diallyl maleate, fumarate or iticonate or diallyl phthalate. Another source of carboxylic exchangers is based on copolymerization of acrylic or methacrylic acid and a polyunsaturated polymerizable compound, such as above noted, with or without another polymerizable ethylenically unsaturated compound, such as ethyl acrylate, methyl methacrylate, butyl methacrylate, or dimethyl itaconate. The copolymers are formed in the conventional way with the aid of a polymerization initiator, such as benzoyl peroxide, lauroyl peroxide, tertiary-butyl perbenzoate, tert-butyl hydroperoxide or cumene hydroperoxide. The carboxylic resins are rendered free of monomeric materials, inhibitor and initiator, as by distilling off material under reduced pressure or with steam, extracting, saturating with an aqueous metal salt solution followed by regenerating, and washing thoroughly with water.

Illustrative of the weakly acid cation exchange resins there can be mentioned those of poly(methacrylic acid), e.g. Rohm and Haas Co. IRC 50. Illustrative of the strongly basic anion exchange resins there can be mentioned those such as quaternized chloromethylated polystrene, e.g. Rohm and Haas Co. IRA 400, IRA 401, IRA 401-S, and IRA 402. Structural formulas for some of the anion and cation exchange resins employed in this invention can be found on page 449 of the Encyclopedia of Chemical Technology, first supplemental volume.

Attempts to achieve rapid disintegration by substituting other types of ion exchange resins have been unsuccessful. Thus the use of weakly basic anion exchange resins containing as the functional group, a primary, secondary or tertiary amino radical, e.g. as those described in U.S. Patent No. 2,402,384, in place of the strongly basic anion exchange resins did not produce a tablet which was rapidly disintegrable. Also, the substitution of strong cation exchange resins, e.g. those having sulfonic acid as the functional group, for the weak cation exchange resins did not produce a tablet which was rapidly disintegrable. Furthermore, the use of each of the strongly basic or weakly acid ion exchange resins alone did not produce the rapid disintegration rates obtained with the combination of resins.

Illustrative of colloidally water dispersible medicaments or substances useful for oral ingestion which can be employed in the tablets of this invention, there can be mentioned: methyl cellulose, polyacrylic acid, polymethylacrylic acid, lactalbumin derivatives; methocel, alginates, caragheenates and gum karaya.

Illustrative of medicaments or substances which form true solutions which find utility by oral ingestion and which can be employed in the tablets of this invention there can be mentioned: sodium salicylate, ammonium chloride, caffein, quinine sulfate, magnesium glyconate, glyceryl guaiacolate, thiamine hydrochloride, niacinamide and ferric ammonium citrate.

The pharmaceutical tablets of this invention can find utility as analgesics, cold remedies, antihistamines, antibiotics, laxatives, antitussives, antacids, antidiarrheals, and the like.

As is conventional with tablet making the ingredients are of small particle size such as from that of about 200 mesh to 8 mesh and preferably that of about 80 mesh to 12 mesh. The ion exchange resins as described in the specification and in the claims are in the commercial forms which contain about 5% moisture; although the particle sizes of the ion exchange resins can be the same as that indicated above for tabletting ingredients, they preferably have particle sizes less than 40 mesh and particularly particle sizes from 100 to 400 mesh. The ingredients composing the tablets of this invention are intimately admixed as is conventional in this art.

In addition to pharmaceutical uses the disintegrants of this invention can be employed in tablets for other than pharmaceutical uses such as in tabletted herbicidal agents.

Advantages of rapid disintegration include: elimination of irritation of the alimentary canal linings as can be caused by a mass of solid medicament; disintegration of a tablet prior to ingestion when placed in water; or simply, for ease of swallowing, by permitting the tablet to break up into small particles while still in the mouth.

The following examples are illustrative of the invention.

Tablets for an antacid preparation containing magnesium carbonate and colloidally water dispersible polymer of acrylic acid cross linked with polyallyl sucrose (such antacid ingredients are described in U.S. Patent 2,912,358) were prepared by the following procedure:

Carbopol 934 (86.5 parts) as obtained from the supplier (B. F. Goodrich) was spread on trays and steam granulated by passing live steam over the powder and then the mass dried overnight at 140°–170° C. (such granulating procedures are described in U.S. Patent 2,909,462). The mass was then ground thru a Fitzpatrick comminutor or thru a Stokes oscillating granulator. All material larger than 12 mesh was rejected and all particles less than 80 mesh were rejected, thereby a particle size range between 12 and 80 mesh was assured. The granules were placed in a PK blender, IRC 50 (6 parts), IRA 400 (3 parts) magnesium carbonate (4 parts) were added; after 10 minutes the blender was stopped and the formula weight of talc (0.5 part) was added and blending continued for an additional five minutes. Tablets were compressed on a Stokes rotary press using 7/16" standard concave punches. Tablet hardness range was held from 10 to 14 Strong-Cobb units.

*Example I*

Each tablet had the following composition:

| | Percent |
|---|---|
| IRC 50 (a carboxylic cation exchange resin manufactured by Rohm & Haas Co.) | 6 |
| IRA 400 (a chlorinated quaternary ammonium anion exchange resin manufactured by Rohm & Haas Co.) | 3 |
| Magnesium carbonate | 4 |
| Acrylic acid polymer[1] | 86.5 |
| Talc | 0.5 |
| | 100.0 |

[1] Carbopol–934 manufactured by B. F. Goodrich Co.

The above table was placed in a 250 ml. beaker containing about 75 ml. of water. Disintegration of the tablet was complete within about 45 seconds after immersion of the tablet in water. Following the procedure of Example I, but employing 5% of each of the ion exchange resins and only 85.5% of the Carbopol-934, similar results were obtained.

Substitution in the formulation of Example I of a weakly basic anion exchange resin, e.g. XE–58 which is manufactured by Rohm and Haas Co., for the IRA 400 produced a tablet which remained undisintegrated after ten minutes of immersion in water. Also the substitution of a strongly acid cation exchange resin having sulfonic acid groups in place of the IRC 50 was as ineffective as the substitution of the weakly basic resin. Elimination of the IRC 50 resin in the composition of Example I and the use of a total of 9% of the IRA 400 resin produced a tablet which remained undisintegrated after ten minutes of immersion in water. Also the use of a total of 9% of the IRC 50 resin and elimination of the IRA 400 produced a tablet which remained undisintegrated after ten minutes.

*Example II*

Following conventional tabletting techniques compressed tablets containing the citric acid salt of diethyl 3-dimethylamino-4,4-dimethylcyclobutane - 1,2 - dicarboxylate as the analgesic agent were prepared having the following composition per tablet.

| | Percent by weight |
|---|---|
| Citric acid salt of diethyl 3-dimethylamino-4,4-dimethylcyclobutane-1,2-dicarboxylate | 67.0 |
| IRC 50 | 7.5 |
| IRA 400 | 7.5 |
| Dicalcium phosphate (excipient) | 17.7 |
| Acacia (binder) | 0.3 |
| | 100.0 |

The tablet of Example II disintegrated in one minute when placed in water.

All parts and percentages in the specification and claims are by weight.

What is claimed is:
1. A tablet comprising a mixture of: (a) a water soluble material; (b) from about 2% to about 10% of an insoluble carboxylic cation exchange resin; and (c) from about 2% to about 10% of an insoluble quaternary ammonium anion exchange resin.

2. A tablet comprising a mixture of: (a) at least 50% of water soluble material; (b) from about 2% to about 10% of an insoluble carboxylic cation exchange resin; and (c) from about 2% to about 10% of an insoluble quaternary ammonium anion exchange resin.

3. A compressed pharmaceutical tablet comprising a mixture of: (a) at least 50% of water soluble material, including a medicament; (b) from about 2% to about 10% of an insoluble weakly acidic carboxylic cation exchange resin; and (c) from about 2% to about 10% of an insoluble strongly basic quaternary ammonium anion exchange resin.

4. The tablet of claim 3 wherein the water soluble medicament is colloidally soluble.

5. The tablet of claim 4 wherein the carboxylic cation exchange resin is that of an insoluble poly (methacrylic acid) resin.

6. A compressed pharmaceutical tablet comprising an intimate admixture of: (a) at least 50% of a water soluble medicament; (b) from about 2% to about 10% of an insoluble weakly acidic carboxylic cation exchange resin; (c) from about 2% to about 10% of an insoluble strongly basic quaternary ammonium anion exchange resin; and (d) at least 0.3% of a binder.

7. A compressed pharmaceutical tablet comprising an intimate admixture of: (a) from about 65% to about 90% of a water soluble medicament; (b) from about 3% to about 8% of an insoluble weakly acidic carboxylic cation exchange resin; (c) from about 3% to about 8% of an insoluble strongly basic quaternary ammonium anion exchange resin; and (d) from about 0.3% to about 5% of a binding agent.

8. A tablet comprising an intimate admixture of: (a) at least 50% of a water soluble material; (b) from about 2% to about 10% of an insoluble weakly acidic carboxylic cation exchange resin containing the functional group

and (c) from about 2% to about 10% of an insoluble strongly basic quaternary ammonium anion exchange resin having the functional group

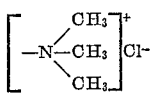

9. The tablet of claim 8 wherein the water soluble material is colloidally soluble.

10. The tablet of claim 8 wherein the cation and anion exchange resins have a particle size of from about 100 to 400 mesh.

11. A compressed pharmaceutical tablet comprising an intimate admixture of: (a) from about 65% to about 90% of a colloidally water soluble medicament; (b) from about 3% to about 8% of an insoluble weakly acidic carboxylic cation exchange resin containing the functional group

and (c) from about 3% to about 8% of an insoluble strongly basic quaternary ammonium anion exchange resin having the functional group

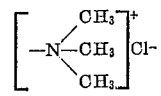

12. The tablet of claim 11 wherein the medicament is an analgesic.

13. The tablet of claim 11 wherein the medicament is a laxative.

14. A compressed tablet completely disintegrable in water in less than five minutes and having disintegrating agents intimately mixed therein, said disintegrating agents comprising from about 2% to about 10% of an insoluble carboxylic cation exchange resin and from about 2% to about 10% of an insoluble strongly basic quaternary ammonium anion exchange resin.

15. A rapidly disintegrable compressed pharmaceutical tablet comprising: (a) at least 50% of a colloidally water soluble material intimately admixed with; (b) from about 2% to about 10% of an insoluble carboxylic cation exchange resin; and (c) from about 2% to about 10% of an insoluble strongly basic quaternary ammonium anion exchange resin.

References Cited in the file of this patent

UNITED STATES PATENTS

| 2,697,059 | Gustus | Dec. 14, 1954 |
| 3,003,920 | Dominick | Oct. 10, 1961 |

FOREIGN PATENTS

| 791,281 | Great Britain | Feb. 26, 1958 |
| 823,000 | Great Britain | Nov. 4, 1959 |
| 833,458 | Great Britain | Apr. 27, 1960 |